United States Patent
Chu

(10) Patent No.: US 8,055,654 B2
(45) Date of Patent: Nov. 8, 2011

(54) LIST SEARCH METHOD FOR MOBILE TERMINAL

(75) Inventor: Se Youp Chu, Gumi-si (KR)

(73) Assignee: Samsung Electronics Co., Ltd., Maetan-dong, Yeongtong-gu, Suwon-si, Gyeonggi-do (KR)

(*) Notice: Subject to any disclaimer, the term of this patent is extended or adjusted under 35 U.S.C. 154(b) by 504 days.

(21) Appl. No.: 11/903,657

(22) Filed: Sep. 24, 2007

(65) Prior Publication Data

US 2008/0086462 A1 Apr. 10, 2008

(30) Foreign Application Priority Data

Oct. 9, 2006 (KR) .................. 10-2006-0097820

(51) Int. Cl.
*G06F 7/00* (2006.01)
*G06F 17/30* (2006.01)
(52) U.S. Cl. ............... 707/722; 707/806; 379/185
(58) Field of Classification Search .......... 707/600–831; 455/11.1, 95, 351, 466; 379/185
See application file for complete search history.

(56) References Cited

U.S. PATENT DOCUMENTS

| | | | | |
|---|---|---|---|---|
| 6,879,843 B1* | 4/2005 | Kim | ................ | 455/557 |
| 7,184,528 B2* | 2/2007 | Kim | ................ | 379/100.14 |
| 2002/0041292 A1* | 4/2002 | Son et al. | .......... | 345/810 |
| 2002/0163543 A1* | 11/2002 | Oshikiri | .......... | 345/810 |
| 2005/0119019 A1* | 6/2005 | Jang | .......... | 455/466 |

FOREIGN PATENT DOCUMENTS

| | | |
|---|---|---|
| JP | 2003-008726 | 1/2003 |
| KR | 2003-21766 | 3/2003 |
| KR | 2003-31232 | 4/2003 |
| KR | 2005-44942 | 5/2005 |
| KR | 2005-119953 | 12/2005 |
| KR | 2006-16265 | 2/2006 |

OTHER PUBLICATIONS

Scott Mackenzie et al., "A Model of Two-Thumb Text Entry", Proceedings of Graphics Interface, 2002, pp. 117-124, Toronto, Canada Information Processing Society, Canada.*

* cited by examiner

*Primary Examiner* — Jean B Fleurantin
(74) *Attorney, Agent, or Firm* — Cha & Reiter, LLC

(57) ABSTRACT

A list search method for a mobile terminal is disclosed. The list search method includes displaying list items of a list requested by a user, and placing a cursor on one of the displayed list items in a visually identifiable manner, inputting at least one numeric key during display of the list and moving the cursor by a skip interval to a list item of the list, wherein the skip interval is associated with the at least one input numeric key. In one aspect, the user can move the cursor in a list by a skip interval by inputting a numeric key, which is translated to a skip interval or the numeric value can itself be used as a skip interval.

16 Claims, 7 Drawing Sheets

FIG. 4

| INPUT KEY | SKIP INTERVAL |
|---|---|
| 1 | 5 |
| 2 | 10 |
| 3 | 15 |
| 4 | 20 |
| 5 | 25 |
| 6 | 30 |
| 7 | 35 |
| 8 | 40 |
| 9 | 45 |
| 0 | 50 |

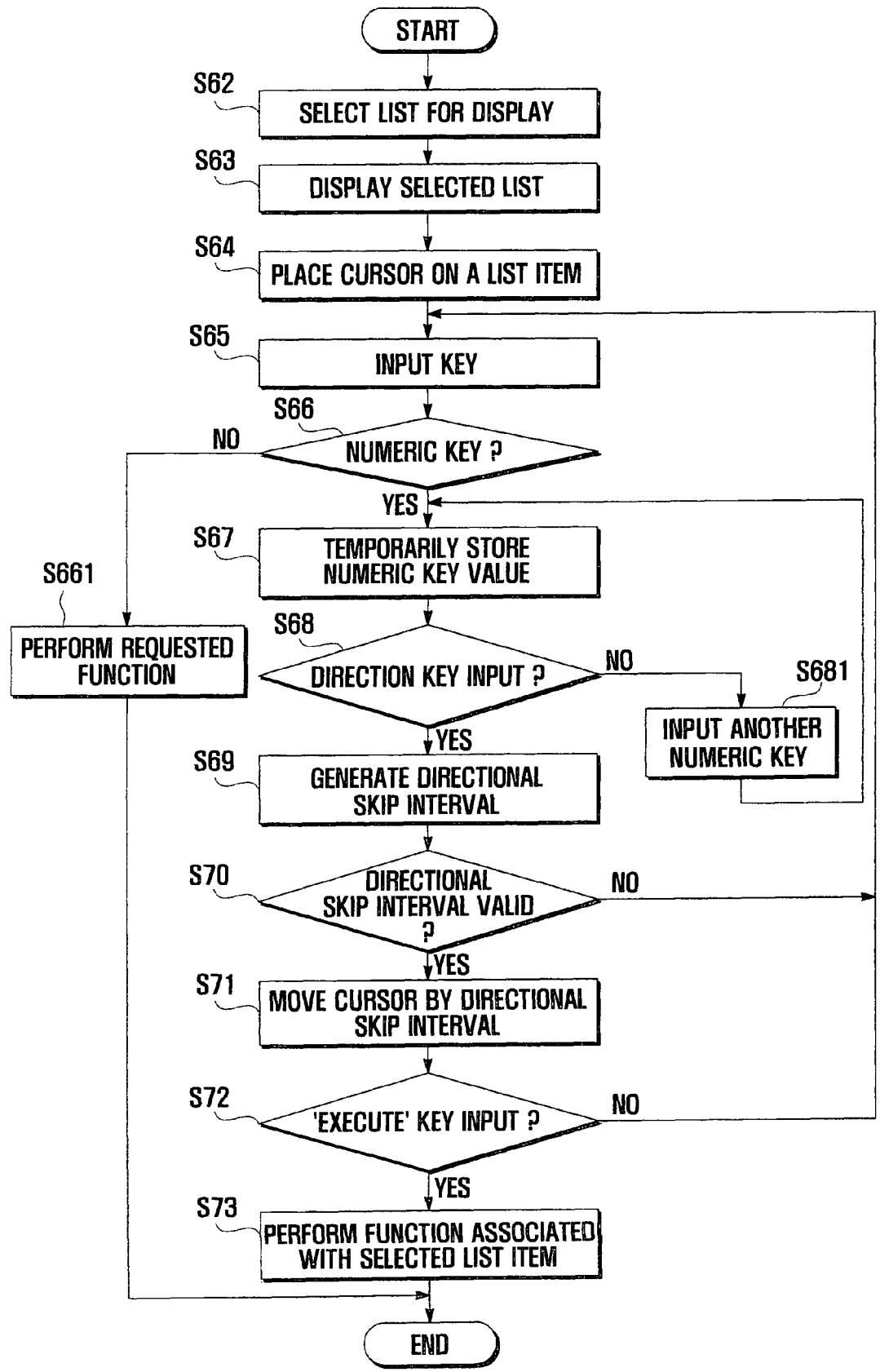

LIST SEARCH METHOD FOR MOBILE TERMINAL

CLAIMS OF PRIORITY

This application claims the benefit of the earlier filing date, pursuant to 35 USC 119, to that patent application entitled "LIST SEARCH METHOD FOR MOBILE TERMINAL," filed in the Korean Intellectual Property Office on Oct. 9, 2006 and assigned Serial No. 2006-0097820, the contents of which are incorporated herein by reference.

BACKGROUND OF THE INVENTION

1. Field of the Invention

The present invention relates generally to a mobile terminals and, more particularly, to a list search method for a mobile terminal wherein a user can quickly search a list of items to find and execute a desired item.

2. Description of the Related Art

With rapid advances in communication technologies, an advanced mobile terminal can support not only conventional call and short message processing but also various supplementary functions related to, for example, video telephony, electronic scheduling, storage of audio and video data, Internet browsing, entertainment, and digital content replay.

To select on of the functions, various lists of list items associated with, for example, digital content are used in a mobile terminal. To select a desired list item in a particular list, the user may have to scroll up and down the screen using up and down direction keys until the cursor is placed on the desired list item.

In a conventional list search method, whenever a direction key is pressed, the cursor moves to the next item in the corresponding direction. When a direction key is kept continuously pressed, the cursor repeatedly moves in the corresponding direction until the direction key is released.

However, in a conventional list search method, if a large number of list items are contained in a list and a list item to be found is present at the end of the list, the user is inconvenienced by having to keep the down arrow key pressed until the cursor moves to the end of the list. In addition, a significant period of time may be required for the user to find a desired list item in a long list.

SUMMARY OF THE INVENTION

The present invention provides a list search method for a mobile terminal enabling the user to quickly search a list having numerous list items for a desired list item.

In accordance with an exemplary embodiment of the present invention, there is provided a list search method for a mobile terminal, including displaying list items of a list requested by a user, and placing a cursor on one of the displayed list items in a visually identifiable manner, wherein the list item on which the cursor is placed is Visually distinguished from the remaining list items inputting at least one numeric key during display of the list and moving the cursor by a skip interval to a list item of the list, wherein the skip interval is associated with the at least one input numeric key.

BRIEF DESCRIPTION OF THE DRAWINGS

The above features and advantages of the present invention will be more apparent from the following detailed description in conjunction with the accompanying drawings, in which:

FIG. 4 illustrates a skip interval table for the method of FIG. 2;

FIG. 6 is a flow chart illustrating a list search method according to another exemplary embodiment of the present invention.

DETAILED DESCRIPTION OF THE INVENTION

Figure 1:
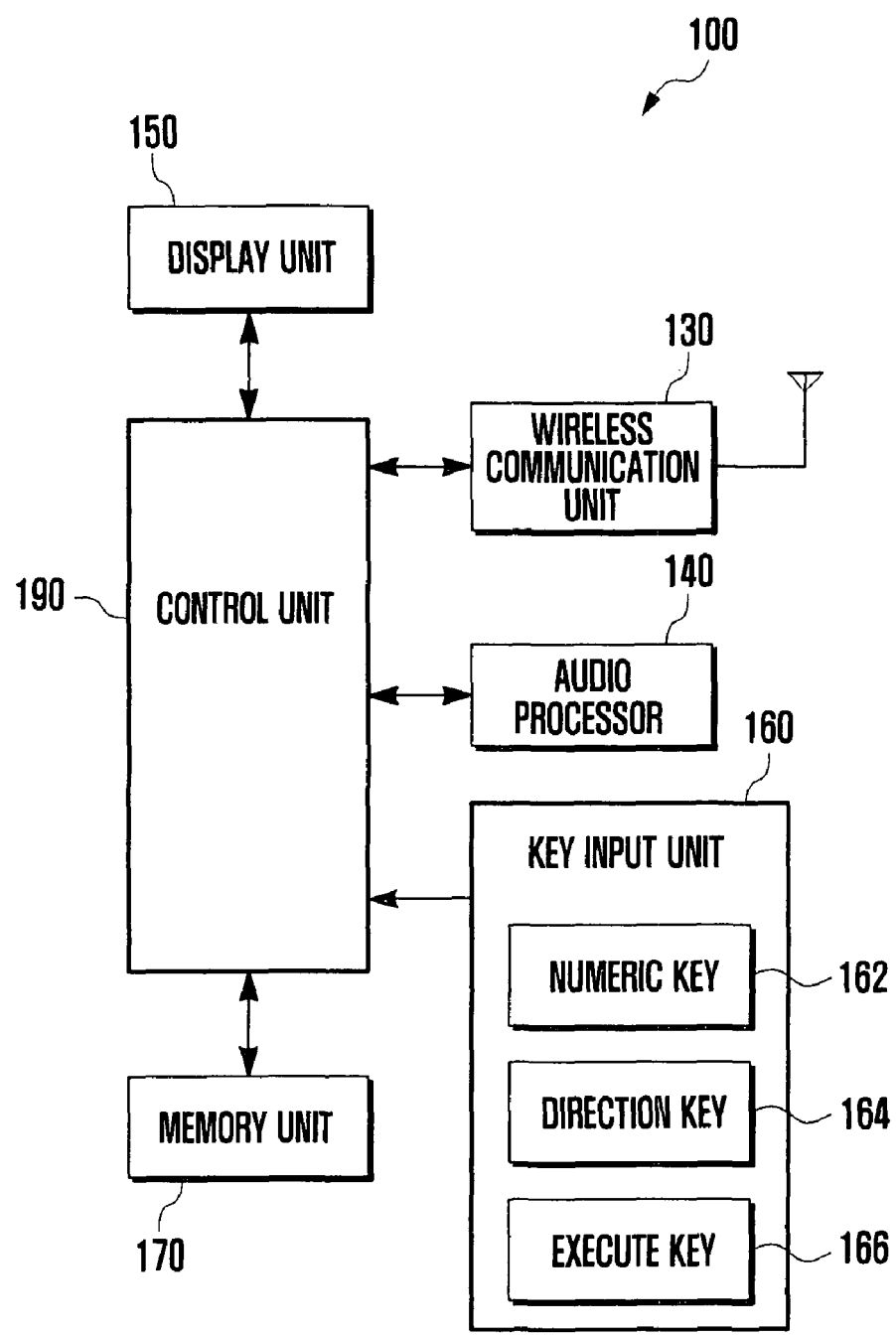
FIG. 1 illustrates a configuration of a mobile terminal capable of using a list search method of the present invention.

Exemplary embodiments of the present invention are described in detail with reference to the accompanying drawings. The same reference symbols identify the same or corresponding elements in the drawings. For the purposes of clarity and simplicity, detailed descriptions of constructions or processes known in the art may be omitted to avoid obscuring the invention in unnecessary detail.

In the description, the term 'list' refers to any list of items, such as a call list of calls recently made and received, a menu of menu items, and a play list of content files. The term 'content' refers to digital contents such as data, information or knowledge that are composed of electronically processed symbols, characters, sounds, or still or moving images. A content file can be used in a mobile terminal though an information and communication network.

FIG. 1 illustrates a configuration of a mobile terminal capable of using a list search method of the present invention.

Referring to FIG. 1, the mobile terminal 100 includes a wireless communication unit 130, audio processor 140, key input unit 160, display unit 150, memory unit 170, and control unit 190.

The wireless communication unit 130 performs wireless data transmission and reception operations for the mobile terminal 100. The wireless communication unit 130 may include a radio frequency (RF) transmitter for upconverting the frequency and amplifying of a signal to be transmitted, and an RF receiver for low-noise amplifying a received signal and downconverting the frequency of the received signal. The wireless communication unit 130 sends data received through a wireless channel to the control unit 190, and transmits data from the control unit 190 through a wireless channel.

The audio processor 140 may include a coder/decoder (codec). The codec may have a data codec for processing packet data and the like, and an audio codec for processing an audio signal such as a voice signal. During call processing, the audio processor 140 converts a digital audio signal from the control unit 190 into an analog signal through the audio codec to reproduce the analog signal through a speaker, and converts an analog audio signal from a microphone into a digital audio signal through the audio codec to provide the digital audio signal to the control unit 190.

The key input unit 160 receives a key signal from the user to control operations of the mobile terminal 100, and sends the received key signal to the control unit 190. The key input unit 160 includes control keys (not shown) for operation control of the mobile terminal 100, a plurality of numeric keys 162 for inputting numerals, direction keys 164, and an 'execute' key 166.

The direction keys 164 are used to specify the search direction (forward or backward direction) in a list. The direction keys 164 may be the volume up and down keys, up and down arrow keys, alphanumeric keys labeled '*' and '#', or a pair of soft keys.

The 'execute' key 166 is used to execute a selected list item or a function associated with the selected list item in a list. The execute key may, for example, be the 'Ok' key.

The display unit 150 displays an image signal from the control unit 190 on a screen. The display unit 150 may include a panel of liquid crystal display (LCD) devices, an LCD controller, and a video memory for storing video data. If the panel has a touch screen capability, the display unit 150 can also act as an input means.

The memory unit 170 includes a program memory section and a data memory section. The program memory section stores programs for controlling the overall operation of the mobile terminal 100, and the data memory section stores data resulting from execution of the programs. In particular, the memory unit 170 stores a skip interval that is input by the user while list searching, or stores a skip interval table from which a particular skip interval is extracted. The skip interval and skip interval table more fully described in connection with FIG. 2.

The control unit 190 controls the overall operation of the mobile terminal 100. In particular, when a user-requested list is displayed on the display unit 150, the control unit 190 moves the cursor along the list on the basis of the key value of a numeric key 162 input by the user.

Figure 2:
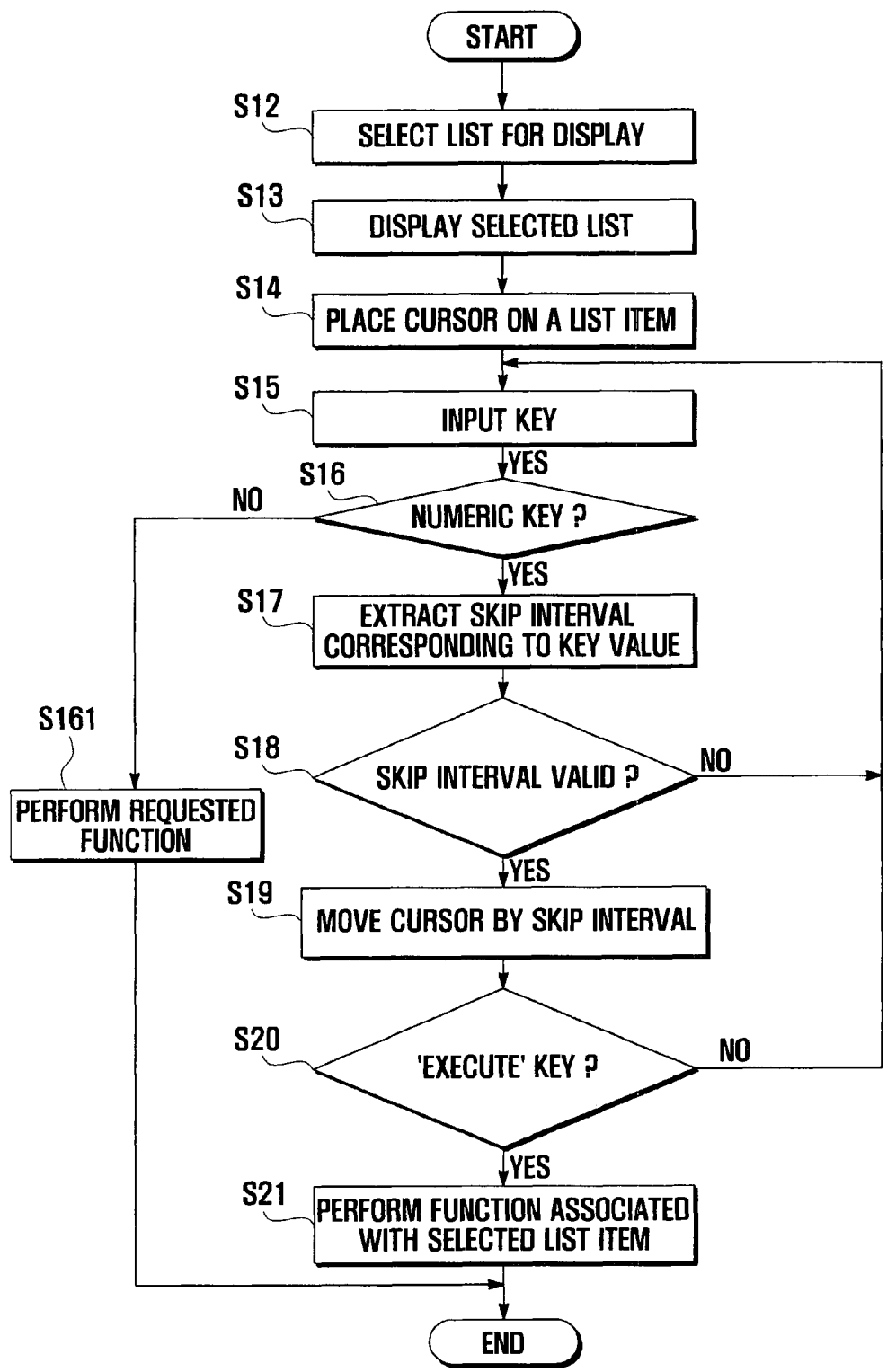
FIG. 2 is a flow chart illustrating a list search method according to an exemplary embodiment of the present invention.
Figure 3A:
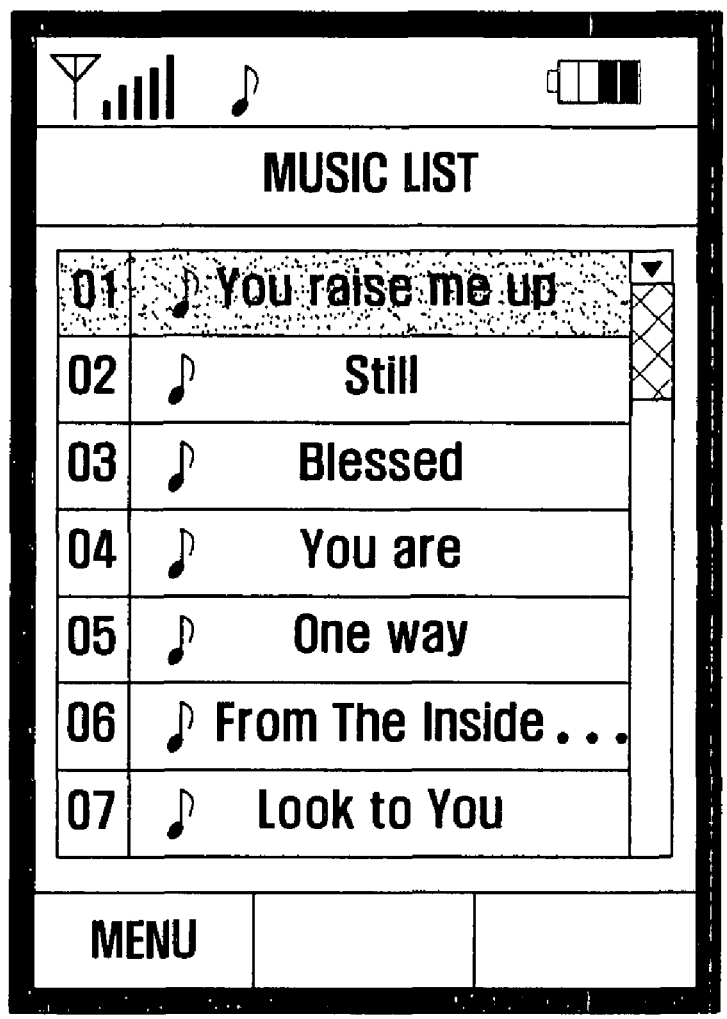
FIGS. 3A and 3B illustrate screen representations of a music list processed by the method of FIG. 2.
Figure 3B:

FIG. 2 is a flow chart illustrating a list search method according to an exemplary embodiment of the present invention. FIGS. 3A and 3B illustrate screen representations of a music list processed by the method of FIG. 2. In the method, the user can rapidly move the cursor to a target list item using a numeric key, unlike a conventional cursor movement approach using a direction key. Referring to FIGS. 1 to 3B, the list search method is described as follows.

When the user of the mobile terminal 100 selects a particular list for display (S12), the control unit 190 displays list items of the selected list (S13). The list may be any list such as a recent call list. For example, as illustrated in FIG. 3A, a name list of audio files (MPEG-1 Audio Layer 3 (MP3) files) may be displayed.

During display of the selected list, the control unit 190 places the cursor on a current list item (for example, the first list item) to sharply distinguish the current list item from remaining list items (S14). For sharp distinction, the current list item, on which the cursor is placed, can be changed in background and character color, be blinked, or be scrolled to the left and right. Although, at the start of list display, the cursor is normally placed on the first list item, the cursor may also be placed on a list item that has been selected before.

After placement of the cursor, when the user inputs a key (S15), the control unit 190 determines whether the input key is a numeric key 162 (S16). If the input key is not a numeric key 162, the control unit 190 performs a function associated with the input key (S161). For example, if the input key is a direction key 164, the control unit 190 moves the cursor to the next or previous list item in a conventional manner.

However, if the input key is a numeric key 162, the control unit 190 extracts a skip interval corresponding to the key value of the input key from a skip interval table (illustrated in FIG. 4) (S17).

Referring to FIG. 4, a skip interval table includes numeric fields and skip-interval fields. A numeric field is used to store a numeric value corresponding to a numeric key value. The key input unit 160 of the mobile terminal 100 includes normally ten numeric keys 162 labeled '0' to '9', and ten numeric fields are present in the skip interval table.

A skip-interval field is used to store a skip interval for cursor movement corresponding to a numeric key value. In the skip interval table of FIG. 4, skip intervals takes numeric values of 5 to 50 at an interval of 5 units. For example, numeric key values of '1' and '2' correspond respectively to skip intervals of '5' and '10'. Further, a numeric key value of '0' corresponds to a skip interval of '50', the user can move the cursor to the next 50th list item with a single numeric key input. The user may also set individual skip intervals if necessary. Accordingly, the skip interval table is suitable for translating the numeric value into a skip interval value Returning to FIG. 2, after extraction of the skip interval corresponding to the input key value, the control unit 190 checks the validity of the skip interval (S18). That is, the possibility of cursor movement from the current list item to a list item on which the cursor is to be moved is checked. For example, in the case of a list of 43 list items, if the user inputs a numeric key '0', the corresponding skip interval is 50. However, the next 50th list item is nonexistent in the list, and the skip interval of 50 is not valid for the list of 43 list items. For another example, in the case when a list has 100 list items and the current list item is the 90th list item, if the user inputs a numeric key '3', the corresponding skip interval is 15. However, the next 15th list item is nonexistent in the list, and the skip interval of 15 is not valid with respect to the current list item (or the position of the cursor). As would be recognized from the examples provided herein, the reference to the skip interval as being valid is determined by determining whether a position determined by the combination of the skip interval and the current position are within a list range.

If the skip interval is not valid, the control unit 190 outputs a message indicating input of an inappropriate numeric key through the display unit 150, and returns to step S15 for new key input.

If the skip interval is valid, the control unit 190 moves the cursor by the skip interval (for example, by 10) in the forward direction, and places the cursor on the corresponding list item, as illustrated in FIG. 3B (S19).

In placement of the cursor on a list item, if the user inputs the 'execute' key 166, the list item is selected for execution and the control unit 190 performs a function associated with the selected list item (S21). If the user inputs a key other than the 'execute' key 166, the control unit 190 returns to step S15 for continued cursor movement.

Figure 5:
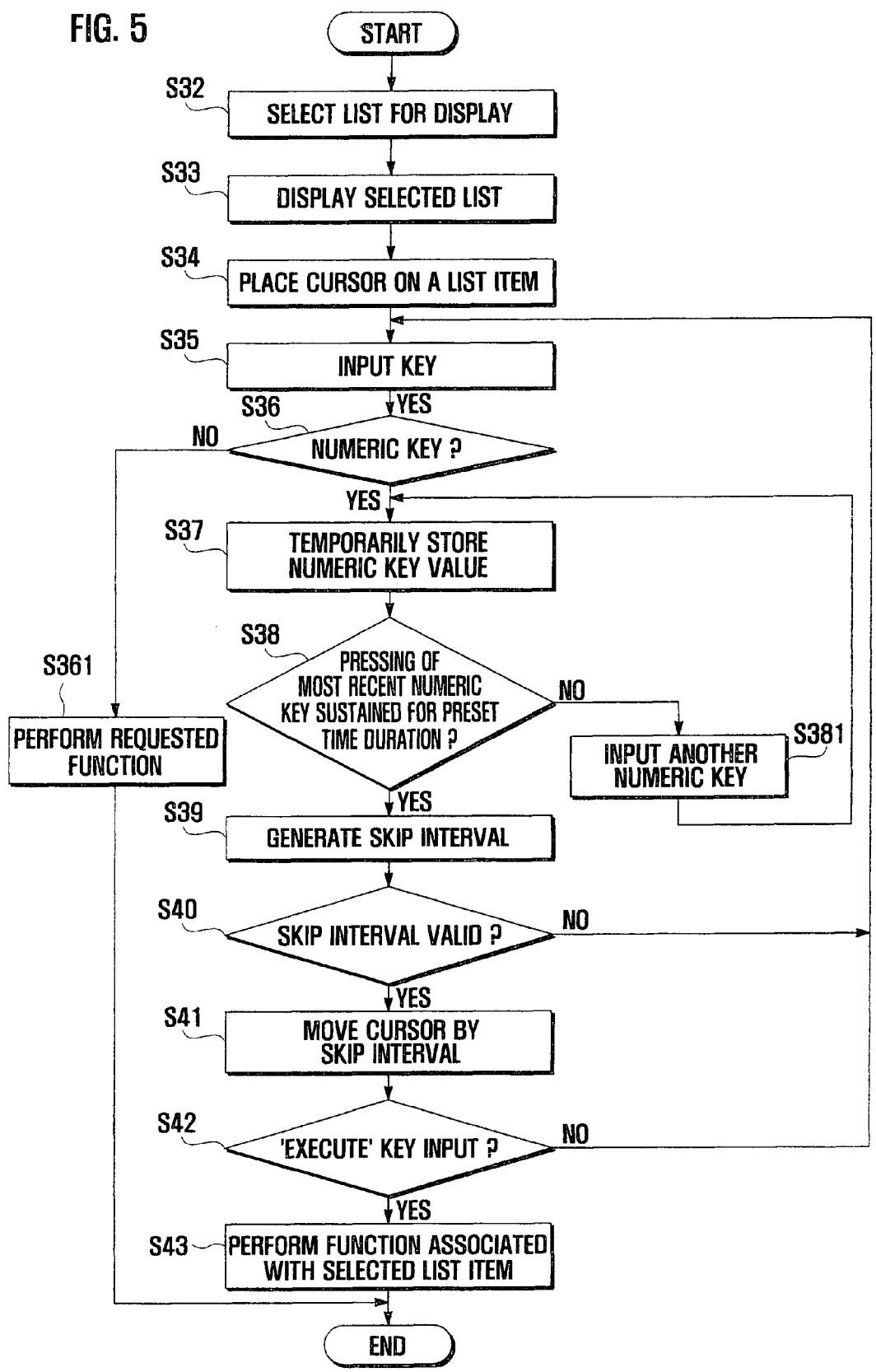
FIG. 5 is a flow chart illustrating a list search method according to another exemplary embodiment of the present invention.

FIG. 5 is a flow chart illustrating a list search method according to another exemplary embodiment of the present invention. Referring to FIGS. 1 and 5, the list search method is described as follows.

When the user of the mobile terminal 100 selects a particular list for display (S32), the control unit 190 displays list items of the selected list (S33), and places the cursor on a current list item (for example, the first list item) (S34).

When the user inputs a key (S35), the control unit 190 determines whether the input key is a numeric key 162 (S36). If the input key is not a numeric key 162, the control unit 190 performs a function associated with the input key (S361). If the input key is a numeric key 162, the control unit 190 temporarily stores the input numeric key value (S37), and determines whether pressing of the most recently input numeric key is sustained for a preset time duration (for example, 2 seconds) (S38). If the most recently input numeric key is pressed and immediately released, the control unit 190 expects input of a next numeric key from the user, receives a numeric key from the user (S381), and temporarily stores the corresponding numeric key value (S37). That is, all input numeric key values are temporarily stored in sequence.

If pressing of the most recently input numeric key is sustained for the preset time duration, the control unit 190 expects end of numeric key input from the user, and generates a skip interval using the at least one stored numeric key value (S39). For example, if the user successively inputs numeric keys '5' and '6' with an extended period of pressing of the numeric key of '6', the control unit 190 generates a skip interval of '56'.

After determination of the skip interval, based on the input value, the control unit 190 checks the validity of the skip interval (S40). If the skip interval is not valid, the control unit 190 outputs a message indicating input of an inappropriate numeric key through the display unit 150, and returns to step S35 for new key input. If the skip interval is valid, the control unit 190 moves the cursor by the skip interval in the forward direction, and places the cursor on the corresponding list item (S41).

In placement of the cursor on a list item, if the user inputs the 'execute' key 166 (S42), the list item is selected for execution and the control unit 190 performs a function associated with the selected list item (S43). If the user inputs a key other than the 'execute' key 166, the control unit 190 returns to step S35.

FIG. 6 is a flow chart illustrating a list search method according to another exemplary embodiment of the present invention. Referring to FIGS. 1 and 6, the list search method is described as follows.

When the user of the mobile terminal 100 selects a particular list for display (S62), the control unit 190 displays list items of the selected list (S63), and places the cursor on a current list item (for example, the first list item) (S64).

When the user inputs a key (S65), the control unit 190 determines whether the input key is a numeric key 162 (S66). If the input key is not a numeric key 162, the control unit 190 performs a function associated with the input key (S661). If the input key is a numeric key 162, the control unit 190 temporarily stores the input numeric key value (S67), and determines whether a direction key 164 is input (S68). If a direction key 164 is not input, the control unit 190 receives a numeric key from the user (S681), and temporarily stores the corresponding numeric key value (S67). That is, all input numeric key values are temporarily stored in sequence.

If a direction key 164 is input, the control unit 190 expects end of numeric key input from the user, and generates a directional skip interval using the at least one stored numeric key value and the input direction key value (up or down) (S69). For example, if the user successively inputs numeric keys '5' and '6', and the 'up' key, the control unit 190 generates a directional skip interval of '−56', which indicates cursor movement in the backward direction.

After generation of the directional skip interval, the control unit 190 checks the validity of the directional skip interval (S70). If the directional skip interval is not valid, the control unit 190 outputs a message indicating input of an inappropriate numeric key through the display unit 150, and returns to step S65 for new key input. If the directional skip interval is valid, the control unit 190 moves the cursor by the directional skip interval in the forward or backward direction depending upon the sign of the directional skip interval, and places the cursor on the corresponding list item (S71).

In placement of the cursor on a list item, if the user inputs the 'execute' key 166 (S72), the list item is selected for execution and the control unit 190 performs a function associated with the selected list item (S73). If the user inputs a key other than the 'execute' key 166, the control unit 190 returns to step S65.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As apparent from the above description, the present invention provides a list search method for a mobile terminal wherein the cursor can be moved in a list by a skip interval at one time and the skip interval corresponds to an input numeric key value or to a value directly input by the user. As a result, the user can rapidly and easily move the cursor in a long list for selection and execution of a desired list item.

While exemplary embodiments of the present invention have been shown and described in this specification, it will be understood by those skilled in the art that various changes or modifications of the embodiments are possible without departing from the spirit and scope of the invention as defined by the appended claims. For example, although, in the description, list items of a list are scrolled up or down, the present invention may also be applied to a list whose list items are scrolled left or right. In addition, although the description is focused on a mobile terminal, the present invention may also be applied to any electronic apparatus that can display a list of list items and input numeric values from a user.

What is claimed is:

1. A list search method for a mobile terminal, comprising the steps of:
    displaying a list of list items requested by a user, and placing a cursor on one of the displayed list items;
    inputting at least one numeric key during display of the list; and
    moving the cursor along the list according to a selected skip interval corresponding to the at least one input numeric key to a target list item of the list, and placing the cursor on the target list item;
    wherein the step of moving the cursor comprises the steps of:
    generating the skip interval using the numeric value of the at least one input numeric key;
    checking whether a target list item to which the cursor is to be moved using the skip interval is present in the list; and
    moving the cursor to the target list item, if a target list item to which the cursor is to be moved using the skip interval is present in the list; and
    wherein an input time duration of the most recently input numeric key is longer than or equal to a preset time duration.

2. The list search method of claim 1, wherein the step of moving the cursor comprises the steps of:
    extracting the skip interval corresponding to the at least one numeric key value of the input numeric key from a skip interval table;
    checking whether a target list item to which the cursor is to be moved using the skip interval is present in the list; and moving the cursor to the target list item, if a target list item to which the cursor is to be moved using the skip interval is present in the list.

3. The list search method of claim 2, wherein the skip interval is settable and changeable by the user.

4. The list search method of claim 1, wherein each list item of the list is related to a content file containing audio or video material.

5. The list search method of claim 1, wherein the step of moving the cursor step comprises the steps:
   determining the skip interval using the numeric value of the at least one input numeric key;
   checking whether a target list item to which the cursor is to be moved using the skip interval is present in the list; and
   moving the cursor to the target list item, if a target list item to which the cursor is to be moved using the skip interval is present in the list.

6. The method of claim 1, further comprising the step of:
   inputting a direction key indicating a direction of cursor movement.

7. The list search method of claim 6, wherein the direction key corresponds to a volume adjustment key.

8. The list search method of claim 7, wherein the step of moving the cursor step comprises:
   generating the directional skip interval using numeric and direction key values of the input numeric and direction keys;
   checking whether a target list item to which the cursor is to be moved using the directional skip interval is present in the list; and
   moving the cursor to the target list item, if a target list item to which the cursor is to be moved using the directional skip interval is present in the list.

9. An apparatus for searching a list of list items, comprising:
   a processor in communication with a memory, the processor executing code for:
   displaying a list of list items requested by a user, and placing a cursor on one of the displayed list items;
   determining a skip interval in response to at least one numeric key input; and
   moving the cursor along the list according to a selected the skip interval corresponding to the at least one input numeric key to a target list item of the list, and placing the cursor on the target list item;
   wherein the step of moving the cursor comprises the stem of:
   checking whether the target list item to which the cursor is to be moved using the skip interval is present in the list; and
   moving the cursor to the target list item, if a target list item to which the cursor is to be moved using the skip interval is present in the list;
   wherein an input time duration of the most recently input numeric key is longer than or equal to a preset time duration.

10. The apparatus of claim 9, wherein the step of determining the skip interval comprises the step of:
    extracting the skip interval corresponding to the at least one numeric key value of the input numeric key from a skip interval table.

11. The apparatus of claim 10, wherein elements with the skip interval are settable and changeable by the user.

12. The apparatus of claim 9, wherein each list item of the list is related to a content file containing audio and/or video material.

13. The apparatus of claim 9, wherein the step of determining the skip interval comprises the step of:
    generating the skip interval as the numeric value of the at least one input numeric key.

14. The apparatus of claim 9, further comprising the step of:
    inputting a direction key indicating a direction of cursor movement.

15. The apparatus of claim 14, wherein the step of wherein the step of determining the skip interval comprises the step of:
    generating the skip interval as the numeric and direction values of the associated input numeric and direction keys.

16. The apparatus of claim 9, wherein the direction key corresponds to a volume adjustment key.

* * * * *

UNITED STATES PATENT AND TRADEMARK OFFICE
CERTIFICATE OF CORRECTION

| | | |
|---|---|---|
| PATENT NO. | : 8,055,654 B2 | Page 1 of 1 |
| APPLICATION NO. | : 11/903657 | |
| DATED | : November 8, 2011 | |
| INVENTOR(S) | : Se Youp Chu | |

It is certified that error appears in the above-identified patent and that said Letters Patent is hereby corrected as shown below:

Column 8, Claim 9, Line 5 should read as follows:
--...the cursor comprises the steps...--

Signed and Sealed this
Tenth Day of July, 2012

David J. Kappos
*Director of the United States Patent and Trademark Office*